United States Patent [19]

Incontro et al.

[11] Patent Number: 4,973,617
[45] Date of Patent: Nov. 27, 1990

[54] WATER-BORNE SURFACE PRINTING INKS CONTAINING ACRYLIC RESIN AND CARBOXYLATED ROSIN MODIFIED POLYAMIDE

[75] Inventors: Richard C. Incontro, Ridgefield Park; John P. Giunta, New Milford, both of N.J.

[73] Assignee: BASF Corporation, Parsippany, N.J.

[21] Appl. No.: 232,066

[22] Filed: Aug. 15, 1988

[51] Int. Cl.⁵ .................. C08L 93/00; C08L 93/04
[52] U.S. Cl. ..................... 524/187; 524/270; 524/272; 524/606; 524/607; 524/608
[58] Field of Search ............. 524/608, 187, 270, 272, 524/606, 607

[56] References Cited

U.S. PATENT DOCUMENTS

| | | | |
|---|---|---|---|
| 3,865,770 | 2/1975 | Blake | 524/187 |
| 4,413,080 | 11/1983 | Blake | 524/187 |
| 4,623,392 | 11/1986 | Ou-Yang | 106/27 |
| 4,690,712 | 9/1987 | Janusz | 527/600 |
| 4,870,119 | 9/1989 | Yee et al. | 524/608 |

FOREIGN PATENT DOCUMENTS 2152514  8/1985  United Kingdom ............ 524/608

*Primary Examiner*—Morton Foelak
*Assistant Examiner*—Dennis R. Daley
*Attorney, Agent, or Firm*—Michael R. Chipaloski

[57] ABSTRACT

Water-borne printing ink compositions based on acrylic resins and maleated rosin modified polyamides are disclosed. The ink compositions are especially useful for printing onto plastic substrates.

3 Claims, No Drawings

WATER-BORNE SURFACE PRINTING INKS CONTAINING ACRYLIC RESIN AND CARBOXYLATED ROSIN MODIFIED POLYAMIDE

BACKGROUND OF THE INVENTION

This invention relates to a novel water-borne ink, its composition and its use as a surface printing ink for printing plastic substrates such as polyolefin, polyester, polyamide and paper substrates coated with plastic polymers of this type. In addition, the invention is directed to the preparation of novel polyamide resin compositions and their use as binder resin in surface printing inks.

Surface printing inks are liquid inks which dry by solvent evaporation sometimes with heat or air blower assistance.

Solvent systems may be either water systems which use water as a partial or total solvent, or systems using volatile organic solvents. Primary solvents are usually alcohols, though some contain other oxygenated and/or aliphatic solvents.

Commonly used film formers for printing unto plastic substrates are usually solvent based. Water based inks have found limited use and are typically made by raising the alkalinity (pH) of an ink system to solubilize carboxylic resins such as rosin resins, modified acrylics and other acidic film formers. Inks of this type have found limited applicability for printing onto plastic substrates.

SUMMARY OF THE INVENTION

The present invention is therefore directed to novel water-based surface and lamination printing ink compositions and to their use as surface printing inks for printing onto substrates and in particular for printing onto plastic substrates. The surface printing inks of the present invention are superior in printing aptitude and color strength.

The binder resin useful in the water-borne surface inks of the present invention is typically based on an acrylic polymer.

Typical acrylic monomers for use as binder resin in the present invention include, for instance, styrenic monomers, acrylic acid or methacrylic acid ester-acrylic acid copolymers. As the acrylic acid ester constituting one component of the foregoing copolymer, ethyl, butyl, isobutyl, n-hexyl, n-octyl, lauryl 2-ethylhexyl and stearyl acrylates are desirable, and particularly 2-ethylhexyl acrylic is effective. Among these copolymers, those having a molecular weight in the range of 30,000-300,000 and a second glass transition in the range of 20°-105° C. are useful. In addition, waterborne resins other than acrylics can also be used according to this invention.

In addition, a carboxylated rosin modified polyamide resin is used at from 5-20% preferably 7-10% by weight as part of the binder resin composition. Carboxylated rosin modified polyamide can be prepared by a fusion process utilizing condensation chemistry. Suitable polymer compositions and the process used is detailed in copending U.S.S.N. 241,533, filed Sept. 7, 1988 of Stone and Wasyliw and entitled Carboxylated Polyamides For Ink Formulations. If desirable an amine crosslinker can be used to increase the molecular weight. Polyamides useful according to this invention include any typically used in printing inks or as hot melt adhesives. Typical polyamides used include products offered by the Henkel Co. under the trade name Macromelts 6238, 6239, 6240; Versamid 750,900,930,940 and 950 as well as Polyamides sold by Union Camp under the trade names Unirez 2220 and 2211. It has been found that this carboxylated rosin modified polyamide, when incorporated into a waterborne printing ink, results in a printing ink exhibiting superior printing aptitude and color strength when used to print onto plastic substrates.

DESCRIPTION OF THE PREFERRED EMBODIMENTS

In order to produce an ink composition according to the present invention, a vehicle is first prepared by dissolving an acrylic resin in ammoniated water. Subsequently, this vehicle is mixed with an aqueous solution of a carboxylated rosin polyamide, and then a pigment or dyestuff is dispersed in the resulting mixture, followed by the addition of wax, an antifoaming agent, surfactant(s) and a plasticizer and further adding water as the occasion demands to thereby adjust such properties as viscosity, color appearance, etc.

The carboxylated rosin polyamide is an essential ingredient in the foundation and is responsible for its good adhesion, clean printing, excellent film wetting, and superior resolubility.

The following examples illustrate the preparation of maleated rosinated polyamide resin and its use in a varnish and water-borne ink formulations. All parts are parts by weight.

EXAMPLE 1

Preparation of Rosinated Polyamide 45.23 parts of maleated rosin is mixed with 45.23 parts polyamide resin and heated at 240° C. for 5 minutes and then 9.54 parts diethanol amine is added. The mixture is heated at 180° C. for 10 minutes. A rosinated polyamide was formed.

EXAMPLE 2

Prepartion of Varnish Blend

The following were blended together:

| Parts | |
|---|---|
| 56.0 | Fortified Latex Lucidene 604 |
| 20.0 | Polyamide Resin (of Example 1) |
| 4.0 | Wax Compound |
| 20.0 | n-Propanol |
| 100.00 | |

The varnish blend of Example 2 was then used to prepare ink compositions according to the present invention. The ratio used to prepare the inks was 50 parts varnish of Example 2 blended with 50 parts of the of the following acrylic water-based inks.

EXAMPLE 3

Rubine Base (Red)

| Parts | |
|---|---|
| 47.0 | Water |
| 36.0 | Styrene Maelic Anhydride Rubine Chip |
| 5.0 | Reagent NH$_4$OH |
| 1.0 | Defoamer |
| 1.0 | Amine |
| 10.0 | Water |

-continued

| Parts | |
|---|---|
| 100.0 | |

EXAMPLE 4

Red Shade Cyan Blue Base

| Parts | |
|---|---|
| 47.0 | Water |
| 36.0 | Styrene Maelic Anhydride Blue Chip |
| 5.0 | Reagent NH$_4$OH |
| 1.0 | Defoamer |
| 100.00 | |

EXAMPLE 5

Green Shade Cyan Blue

| Parts | |
|---|---|
| 50.0 | Water |
| 36.0 | Styrene Maelic Anhydride Blue Chip |
| 1.0 | Amine |
| 6.0 | Reagent NH$_4$OH |
| 1.0 | Defoamer |
| 6.00 | Water |
| 100.00 | |

EXAMPLE 6

H.R. Yellow Base

| Parts | |
|---|---|
| 52.0 | Water |
| 36.0 | Styrene Maelic Anhydride Yellow Chip |
| 1.0 | Amine |
| 6.0 | Reagent NH$_4$OH |
| 1.0 | Defoamer |
| 4.0 | Water |
| 100.0 | |

EXAMPLE 7

AAOT Diarylide Yellow

| Parts | |
|---|---|
| 52.0 | H$_2$O |
| 36.0 | Styrene Maelic Anhydride Yellow Chip |
| 1.0 | Defoamer |
| 6.0 | Reagent NH$_4$OH |
| 1.0 | Amine |
| 4.0 | Water |
| 100.0 | |

Example 8

The rubine red base of example 3 and the red shade cyan blue of example 4 were printed onto treated polyethylene using an anilox roll. Press speeds of 700 to 1,000 fpm were used to apply the ink. Both water-borne inks exhibited excellent gloss and had no pinholes. Scotch tape TM adhesion performance was found to be excellent for both inks.

We claim:
1. A water-borne ink composition comprising a blend of an acrylic resin and a carboxylated rosin modified polyamide.
2. A water-borne ink composition of claim 1 wherein the acrylic resin vehicle is produced from acrylic and methacrylic monomers.
3. A water-borne ink composition of claim 1 wherein rosin is carboxylated by a fusion reaction.

* * * * *